United States Patent [19]

Kaiser

[11] Patent Number: 4,770,344

[45] Date of Patent: Sep. 13, 1988

[54] POWDER SPRAYING SYSTEM

[75] Inventor: Thomas A. Kaiser, Vermilion, Ohio

[73] Assignee: Nordson Corporation, Amherst, Ohio

[21] Appl. No.: 939,089

[22] Filed: Dec. 8, 1986

[51] Int. Cl.$^4$ .......................... B05B 1/08; B65G 53/08

[52] U.S. Cl. ......................................... 239/8; 239/124; 239/704; 406/3; 406/19; 406/61

[58] Field of Search ................................ 239/704–707, 239/124; 406/3, 19, 61, 153

[56] References Cited

U.S. PATENT DOCUMENTS

| | | | |
|---|---|---|---|
| 1,450,903 | 4/1923 | Newhouse | 406/61 |
| 2,889,856 | 6/1959 | Magnuson . | |
| 3,053,276 | 9/1962 | Woodward . | |
| 3,186,132 | 6/1965 | Duncan et al. . | |
| 3,458,237 | 7/1969 | Noe . | |
| 3,536,514 | 10/1970 | La Fave et al. . | |
| 3,558,052 | 1/1971 | Dunn | 239/3 |
| 3,567,288 | 3/1971 | Wood . | |
| 3,578,009 | 5/1971 | Spyropoulos | 137/81.5 |
| 3,696,780 | 10/1972 | Fritzsche | 118/69 |
| 3,834,418 | 9/1974 | Clancy | 137/625.48 |
| 3,887,111 | 6/1975 | Bullivant | 222/57 |
| 3,901,184 | 8/1975 | Payne et al. | 118/629 |
| 3,907,170 | 5/1975 | Schedrin et al. | 222/135 |
| 3,918,401 | 11/1975 | Blakeslee | 118/630 |
| 3,944,050 | 3/1976 | Kane | 198/37 |
| 3,982,050 | 9/1976 | Kato et al. | 427/181 |
| 4,025,660 | 5/1977 | Crose et al. | 427/28 |
| 4,025,664 | 5/1977 | Gerek et al. | 427/183 |
| 4,109,027 | 8/1978 | Crose | 427/28 |
| 4,114,810 | 9/1978 | Masuda | 239/706 |
| 4,138,161 | 2/1979 | Payne | 302/28 |
| 4,165,134 | 8/1979 | Payne | 406/1 |
| 4,170,194 | 10/1979 | Etlin | 118/629 |
| 4,205,621 | 6/1980 | Payne et al. | 118/622 |
| 4,212,266 | 7/1980 | Payne et al. | 118/712 |
| 4,233,932 | 11/1980 | Blakeslee | 118/306 |
| 4,248,379 | 2/1981 | Hollstein et al. | 239/1 |
| 4,272,567 | 6/1981 | Blakeslee | 427/236 |
| 4,291,640 | 9/1981 | Payne et al. | 118/50.1 |
| 4,302,481 | 11/1981 | Ribnitz et al. | 427/27 |
| 4,314,669 | 2/1982 | Moos | 239/1 |
| 4,346,667 | 8/1982 | Stamets et al. | 118/622 |
| 4,480,947 | 11/1984 | Nagasaka | 406/14 |
| 4,494,678 | 1/1985 | Klein | 222/77 |
| 4,524,886 | 6/1985 | Wilson et al. | 222/58 |
| 4,543,274 | 9/1985 | Mulder | 239/434.5 |
| 4,561,380 | 12/1985 | Mulder et al. | 239/434.5 X |
| 4,562,095 | 12/1985 | Coulon et al. | 427/180 |
| 4,563,840 | 1/1986 | Urakami | 51/410 |
| 4,600,603 | 7/1986 | Mulder | 239/427.3 |

FOREIGN PATENT DOCUMENTS

| | | | |
|---|---|---|---|
| 2101123 | 3/1972 | Fed. Rep. of Germany . | |
| 1320355 | 7/1963 | France . | |
| 1379322 | 1/1975 | United Kingdom | 406/61 |

OTHER PUBLICATIONS

"Fox Venturi Eductors", Fox Valve Development, Bulletin 300, May 1985.

*Primary Examiner*—Andres Kashnikow
*Assistant Examiner*—Karen B. Merritt
*Attorney, Agent, or Firm*—Wood, Herron & Evans

[57] ABSTRACT

A power spray system for applying particulate powder material to a substrate includes a volumetric or gravimetric dry material feeding device having an outlet connected to a manifold formed with an internal cavity and a plurality of passageways communicating with the internal cavity. A highly accurately metered quantity of powder is transmitted into the internal cavity of the manifold, which is either applied to the substrate or recirculated back to the powder source. An air amplifier connected to one of the passageways is operable to draw ambient air through a vent passageway into the internal cavity of the manifold to form a stream of air-entrained powder. The powder stream is then drawn out of the internal cavity of the manifold by the air amplifier into a spray gun for discharge onto the substrate. A second air amplifier connected to another passageway formed in the manifold is operated when the first air amplifier in the spray gun is closed to draw the powder entering the manifold into a return line for recirculation back to the powder source.

11 Claims, 1 Drawing Sheet

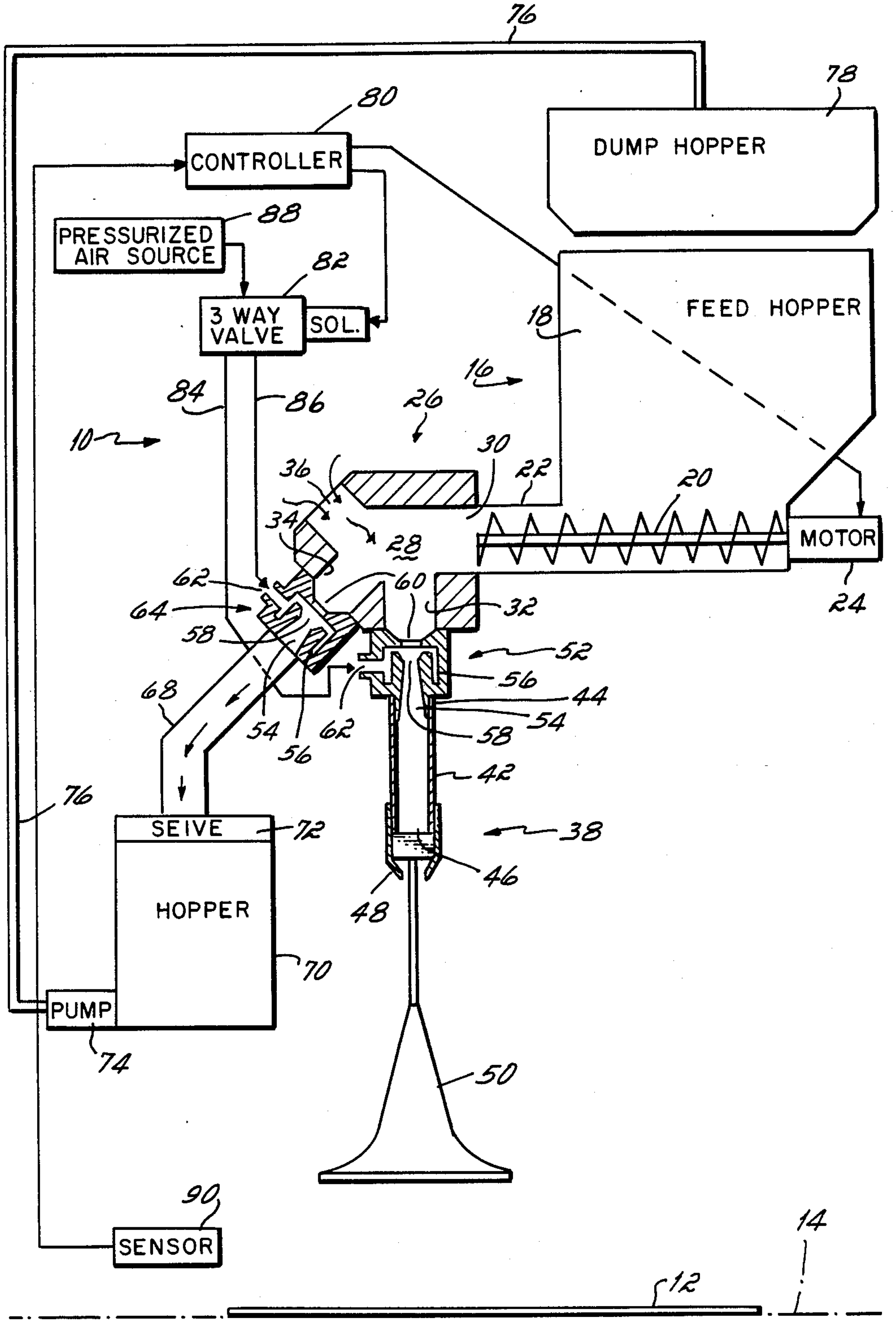
76
78
80
CONTROLLER
DUMP HOPPER
PRESSURIZED AIR SOURCE
88
82
3 WAY VALVE
SOL.
FEED HOPPER
18
16
84
86
26
10
30
36
22
20
34
28
MOTOR
62
60
64
32
24
58
52
68
56
44
54
54
62
58
56
42
76
38
SEIVE
72
46
48
HOPPER
70
PUMP
74
50
90
SENSOR
14
12

POWDER SPRAYING SYSTEM

BACKGROUND OF THE INVENTION

This invention relates to powder spraying systems, and, more particularly, to a system for applying particulate powder material in accurately metered quantities onto a target surface.

Powder spray systems for applying particulate powder material onto a substrate generally include a powder pump for transporting air-entrained powder from a fluidized bed powder container through a pneumatic conveyor line to a powder spray gun. A conventional open top fluidized bed powder container includes four sidewalls, a bottom wall and an air-pervious wall spaced above the bottom wall which supports the particulate powder material. A chamber is formed between the air-pervious wall and the bottom wall into which high pressure air is introduced through a fluidizing air line. The pressurized fluidizing air passes into the air chamber and then moves upwardly through the pervious wall to'fluidize the powder, i.e., make it readily flowable, for delivery through the pneumatic conveyor line to the spray gun.

In many applications, a venturi-type powder pump is mounted within the container which pumps the fluidized powder into the pneumatic conveyor line for delivery to the powder spray gun. Venturi powder pumps include a siphon tube which extends into the fluidized powder within the container, and a venturi pumping chamber connected to the siphon tube. High pressure air is directed through a delivery air line into the venturi pumping chamber and in the course of passage therethrough creates a negative pressure within the venturi pumping chamber which sucks or draws powder from the container through the siphon tube and into the pumping chamber.

Venturi powder pumps also commonly include a metering or atomizing chamber connected to the siphon tube. High pressure atomizing air enters the atomizing chamber through an atomozing air line and impacts the fluidized powder being drawn through the siphon tube by the delivery air line. The atomizing air controls the amount of air mixed with the powder flowing to the venturi pumping chamber to obtain the desired feed rate of powder material flowing into the pneumatic conveyor line for delivery to the spray guns.

Powder spray systems employing metered venturi powder pumps therefore require three separate air lines to deliver particulate powder material from a container to a spray gun, including a fluidizing air line to fluidize the powder within the container, a delivery air line to draw the fluidized powder out of the container into the pump and an atomizing air line to meter or atomize the powder before it exits the pump. Powder spray systems of this type require a substantial quantity of air to operate all three lines. In addition, the pressure in each air line is generally not the same. This requires some type of air supply system capable of providing different air pressure to each of the fluidizing, delivery and atomizing air lines. One such system is disclosed, for example, in U.S. Pat. No. 4,640,310, filed Dec. 26, 1984 and entitled, "Variable Air-Piloted Air Regulator System", which is owned by the assignee of this invention. Air supply systems of this type, although effective, add cost to the overall powder spray system.

Another problem with powder spray systems employing venturi powder pumps is that the volumeric capacity of venturi powder pumps is relatively modest, i.e., on the order of about 20 grams per second. Some applications require additional capacity which cannot be accommodated by standard venturi powder pumps.

A further problem with venturi powder pumps is the difficulty in obtaining a consistently accurate feed rate of particulate powder material, particularly in applications requiring "stitching" or intermittent application of powder onto a substrate. As mentioned above, the powder/air ratio in the air-entrained powder stream is primarily determined by the air pressure in the atomizing air line, and, to a lesser extent, in the fluidizing and delivery air lines. The air pressure within such lines can be controlled with reasonable accuracy, but some fluctuations do occur particularly when the spray gun is operated intermittently with the result that the feed rate of powder delivered to the spray gun can be inconsistent. This is unacceptable in some applications, such as the application of particulate powder adhesive material onto the non-woven fabric materials used in the fabrication of disposable diapers, where the quantity of adhesive material applied to the non-woven fabric must be controlled with high accuracy. If too little adhesive material is applied to the non-woven fabric, for example, the finished diaper may not have the required tensile strength. Too much powder adhesive material applied to the non-woven fabric might result in a diaper having less softness or fluffiness than desired.

Another problem with powder spray systems employing venturi powder pumps involves the physical size of such systems. It has been found that particulate powder material tends to collect in the delivery lines or hoses between the venturi powder pump and spray gun if the hoses are relatively long. This creates a problem known as "puffing" in which the powder collects in the hose and creates a pressure buildup or back pressure in the hose. When the back pressure is sufficient, a relatively large quantity of the collected powser is suddenly forced into the spray gun at one time creating an undesirable surge of powder onto the substrate. In order to avoid "puffing", the venturi pumps must be located close to the spray gun to shorten the length of the hoses as much as possible. But in many diaper lines, for example, there is no room to position the spray gun, venturi pump and powder container immediately adjacent the line. Redesign of the diaper line to provide additional space is expensive, if it is feasible to do at all.

SUMMARY OF THE INVENTION

It is therefore among the objectives of this invention to provide a powder spray system which is capable of providing accurately metered quantities of powder material to a spray gun, which requires a minimal amount of operating air, which is compact and easily installed in a wide variety of applications and which is capable of providing high feed rates of particulate powder material.

These objectives are accomplished in a powder spray system which is predicated upon the concept of applying particulate powder material onto a substrate by employing a volumentric or gravimetric feeding device which delivers particulate powder material into a powder spray gun through a compact manifold having multiple passageways. The powder feeding device is capable of deliverying a highly accurately metered quantity of powder, at a wide range of feed rates, into an internal cavity formed in the manifold. The spray gun is directly connected to the manifold via an air amplifier and is operable to draw the powder from the internal cavity and into the spray gun, where, in the course of passage therethrough, the powder is accelerated by the air amplifier for application onto the substrate.

More specifically, in a presently preferred embodiment, the manifold is formed with a vent passageway, outlet passageway, return passageway and inlet passageway which extend between the internal cavity and the outer surface of the manifold. The inlet passageway of the manifold is connected to an outlet line of the powder feeding device for transmitting particulate powder material directly into the internal cavity of the manifold. A spray gun communicates with a first air amplifier, connected to the outlet passageway, which is operable to draw ambient air through the vent passageway of the manifold into the internal cavity. As the ambient air enters the internal cavity, it mixes with the powder from the powder feeding device to form a stream of air-entrained powder within the internal cavity. The air amplifier then draws the stream of air-entrained powder through the outlet passageway of the manifold into the spray gun. In the course of passage through the air amplifier, the air-entrained powder stream is impacted with a high velocity stream of air supplied by a single air line which accelerates the powder stream through the spray gun for ejection onto the target substrate.

A second air amplifier is connected to the return passageway in the manifold within a return line which leads back to the powder feeding device. The second air amplifier operates to draw the powder from the internal cavity of the manifold and into the return line for recirculation back to the powder feeding device. Filtering and/or screening devices are also disposed in the return line to remove impurities from the powder if required for a particular application.

In a presently preferred embodiment, the air amplifiers are opened and closed by a three-way solenoid valve operated by a controller. The solenoid valve is operated so that when the first air amplifier connected to the spray gun is operating, the second air amplifier in the return line is closed and vice versa. The powder feeding device therefore continuously feeds particulate powder mateiral into the manifold, and the powder material is either recirculated to the powder feeding device by operation of the second air amplifier or sprayed onto the target substrate by operation of the first air amplifier. The powder spray system of this invention may be operated to spray particulate powder material continuously onto a substrate, or it may be operated intermittently in a stitching operation to apply particulate powder material at discrete locations such as separate sections of non-woven fabric material used in manufacturing disposable diapers.

In a presently preferred embodiment, the outlet passageway and return passageway of the manifold are both formed in the manifold below the inlet passageway which receives the particulate powder material. The powder transmitted to the internal cavity of the manifold is therefore acted upon by gravity, at least to some degree, and moves toward the outlet and return passageways. Preferably, the outlet passageway and return passageway are formed at acute angles relative to the axis of the inlet passageway to provide a relatively smooth path for the powder moving from the inlet passageway to the manifold thereto.

As described in detail below, the powder spray system of this invention requires only a single air line to operate each of the air amplifiers. The separate fluidizing, delivery and atomizong air lines used in prior art powder spray systems employing venturi powder pumps are eliminated. The volumentric or gravimetric powder feeding device delivers a highly accurately metered quantity of powder to the spray gun over a wide range of feed rates. Such powder feeding devices achieve not only a more consistent feed rate as compared to prior art venturi powder pumps, but also are capable of delivering up to about fifty times more powder material to the spray guns than venturi powder pumps. In addition, the overall size of the powder feeding device, manifold and spray gun is relatively small and can be easily incorporated into virtually any type of application, including disposable diaper lines, without requiring modification or redesign of existing equipment.

DESCRIPTION OF THE DRAWINGS

The structure, operation and advantages of a presently preferred embodiment of this invention will become further apparent upon consideration of the following description taken in conjunction with the accompanying drawings, wherein:

The FIGURE is an overall, partially schematic view of the powder spray system of this invention.

DETAILED DESCRIPTION OF THE INVENTION

Referring now to the drawing, the powder spray system 10 of this invention is illustrated in an application for appling particulate powder adhesive material onto a discrete section 12 of non-woven material placed atop a moving conveyor 14. This is one of the steps in the manufacture of disposable diapers which does not form a part of this invention per se. The powder spray system 10 is also useful for other applications, as described in more detail below.

In a presently preferred embodiment, the system 10 includes a volumetric-type, dry material feeding device 16 which consists of a hopper 18 and a rotatable auger or screw 20 mounted in the base of the hopper 18 and extending along an outlet line 22 connected to the hopper 18. The screw 20 is driven by a variable speed motor 24. The volumetric feeding device 16 illustrated in the drawings does not form a part of this invention per se and is thus not described in detail herein. One example of a suitable feeding device is commercially available from the AccuRate Division of Moksnes Manufacturing Inc. of Whitewater, Wis. It is contemplated, however, that other types of dry material feeder devices, including gravimetric feeders, would be suitable for use in this invention.

Particulate powder material such as particulate powder adhesive is loaded into the hopper 18 of the feeding device 16 and transmitted into the outlet line 22 in highly accurately metered quantities by rotation of the screw 20. The powder is transmitted from the outlet line 22 into a manifold 26 shown in the center of FIG. 1. The manifold 26 is a block formed with an internal cavity 28 and a plurality of passageways extending from the internal cavity 28 to the outer surface of the manifold 26. These passageways include an inlet passageway 30 connected to the outlet line 22 of screw feeder 16, an outlet passageway 32, a return passageway 34 and a vent passageway 36.

In a presently preferred embodiment, both the outlet passageway 32 and return passageway 34 are formed in the manifold 26 below the inlet passageway 30 so that the particulate powder material introduced into the internal cavity 28 through the inlet passageway 30 flows by gravity toward the outlet and return passageways 32, 34. The outlet passageway 32 is positioned approximately 90° relative to the longitudinal axis of the inlet passageway 30, and the return passageway 34 is positioned approximately 45° with respect to the axis of the inlet passageway 30 and the axis of the outlet passageway 32. In an alternative embodiment (not shown), the return passageway 34 is positioned on the opposite side of outlet passageway 32, immediately beneath the inlet passageway 30, at an angle of approximately 45° relative to the axis of the inlet passageway 30. The vent passageway 36 is formed in the manifold 26 above the inlet passageway 30 at an angle of approximately 45° with respect to the axis of the inlet passageway 30 and is open to the atmosphere. The angles of the outlet, return and vent passageways 32, 34, 36 relative to the inlet passageway 30 are not critical and could be varied to some extent, but are intended to aid in producing a smooth, relatively turbulence-free flow of air and powder within the manifold 26 as described below.

A spray gun 38 is positioned immediately above the conveyor 14 for spraying particulate powder material onto each section 12 of non-woven material. The spray gun 38 is of the type disclosed in U.S. Pat. No. 4,561,380, assigned to the same assignee as this invention, which patent is incorporated by reference in its entirety herein. Briefly, the spray gun 38 comprises a vertically oriented barrel 42 having an inlet end 44 and a discharge end 46. A nozzle 48 is fitted over the discharge end 46 which is connected to a deflector 50 as described in U.S. Pat. No. 4,561,380.

The inlet end 44 of the spray gun 38 is connected to a first air amplifier 52 which, in turn, is connected to the outlet passageway 32 in the manifold 26. The first air amplifier includes a central nozzle formed with a central axial bore 54 co-axially aligned with the bore of the barrel 42. An annular air flow chamber 56 is connected by an annular orifice 58 to the axial bore 54. An annular lip 60 extends inwardly to the rear of the annular orifice 58 which is connected to the outlet passageway 32 of manifold 26. High pressure, compressed air is supplied to the annular, air flow chamber 56 through a bore 62 formed in the amplifier 52.

A second air amplifier 64 is mounted to the return passageway 34 of the manifold 26 which is identical to the air amplifier 52 in spray gun 38. The same reference numbers used in describing air amplifier 52 are applied to the same structure of the first air amplifier 64. Preferably, the central axial bore 54 of air amplifier 64 is connected to a return line 68 which leads to a return hopper 70 having a sieve 72 mounted thereto. A powder transfer pump 74 is connected to the return hopper 70 which is operable to pump powder through a connector line 76 into a dump hopper 78 mounted immediately above the hopper 18 of screw feeder 16.

The operation of powder spray system 10 is controlled by a controller 80 which does not form a part of this invention per se and is therefore not described in detail herein. One controller 80 which has been found suitable for this application, for example, is a Model No. PC-10 pattern controller commercially available from Nordson Corporation of Amherst, Ohio, the assignee of this invention. The controller 80 operates the drive motor 24 connected to screw 20 of feeding device 16, and is also operatively connected to a three-way solenoid valve 82. The solenoid valve 82 is connected by air lines 84, 86 to the inlet bores 62 of air amplifiers 52, 64, respectively. An air source 88 supplies operating air to the air lines 84, 86 via the three-way solenoid valve 82.

The powder spray system 10 operates in the following manner. The controller 80 drives motor 24 to rotate the screw 20 which removes a highly accurately metered quantity of particulate powder material from the hopper 18 into and transmits the powder through outlet line 22 into the internal cavity 28 of manifold 26. Assuming a section 12 of non-woven material to be sprayed is located beneath the spray gun 38 as shown in the drawing, a sensor 90 associated with conveyor 14 sends a signal to the controller 80. In response, the controller 80 operates the three-way solenoid valve 82 so that operating air is supplied through air line 84 into the air amplifier 52 connected to spray gun 38.

The high velocity air entering the air flow chamber 56 creates a negative pressure within the internal cavity 28 of the manifold 26 which sucks or draws ambient air through the vent passageways 36 into the internal cavity 28. The ambient air from the vent passageway 36 contacts the particulate powder material entering the internal cavity 28 through inlet passageway 30 to form a stream of air-entrained powder within the internal cavity 28. The air-entrained powder is then drawn from the internal cavity 28 into the spray gun 38 by the air amplifier 52 and is impacted by a stream of high speed air in the course of its passage through the air amplifier 52. As described in detail in U.S. Pat. No. 4,561,380, the air amplifier 52 imparts a high velocity to the particulate powder material flowing into the spray gun 38 for discharge onto the non-woven sections 12 on conveyor 14.

The first air amplifier 52 is operated until the non-woven section 12 passes by, at which time the sensor 88 sends a second signal to controller 80. In respone to this second signal indicating an absence of a section 12 beneath spray gun 38, the controller 80 operates the three-way solenoid valve 82 to simultaneously close the flow of air through air line 84 to air amplifier 52 and open the flow of air through air line 86 connected to the second air amplifier 64 mounted at the return passageway 34. The air amplifier 64 operates in the identical fashion described above for air amplifier 52. Particulate powder material entering the internal cavity 28 of manifold 26 is drawn by air amplifier 64 into the return passageway 34 instead of into the spray gun 38. Of course, with the first air amplifier 52 operational, the controller 80 operates the three-way solenoid valve 82 to simultaneously close the air flow through line 86 and open the flow to line 84 feeding the air amplifier 52.

In applications such as the coating of non-woven sections 12, there is a possibility that impurities such as fibers and the like could be present in the powder within internal cavity 28. In such applications, the air amplifier 64 transmits the powder into return line 68 and then through the sieve 72 of return hopper 70 for filtering the powder material. Once filtered, the particulate powder material is transmitted by the powder transfer pump 74 back to the screw feeder 16 via dump hopper 78. Alternatively, in applications where the particulate powder material is unlikely to become contaminated, the return line 68 connected to air amplifier 64 is connected directly to the screw feeder 16 or the dump hopper 78.

Although the powder spray system 10 in the illustrated embodiment is intended for intermittent operation of spray gun 38, it should be understood that the system 10 could be employed in applications where a continuous pattern of particulate powder material is required from spray gun 38. This is accomplished by programming controller 80 to operate the three-way solenoid valve 82 so that the air line 84 to air amplifier 52 connected to spray gun 38 is constantly open.

Additionally, the drive motor 24 for screw feeder 16 may be operated at varying speeds by controller 80 to vary the quantity of particulate powder material removed from the hopper 18 according to the demands of a particular application. Regardless of the rate of flow of powder entering internal cavity 28 of manifold 26, the air amplifier 52, 64 are supplied with a constant pressure operating air from the three-way solenoid valve 82.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A powder spray system for applying particulate powder material onto a substrate, comprising:

a source of particulate powder material having an outlet line and feeder means for transmitting a metered quantity of particulate powder material into said outlet line;

a manifold having an internal cavity, said manifold being formed with an inlet passageway, an outlet passageway and a vent passageway each connected to said internal cavity, said inlet passageway being connected to said outlet line of said source for transmitting particulate powder material into said internal cavity;

said outlet passageway being connected to said internal cavity in said manifold vertically below said inlet passageway forming a powder flow path therebetween along which particulate powder material entering said internal cavity through said inlet passageway can flow by gravity toward said outlet passageway, said vent passageway being connected to said internal cavity of said manifold at a location other than along said powder flow path between said inlet passageway and said outlet passageway;

air amplifier means connected to said outlet passageway for drawing ambient air through said vent passageway into said internal cavity for combination with particulate powder material transmitted therein to form a stream of air-entrained particulate powder material within said internal cavity;

a spray gun connected to said air amplifier means, said air amplifier means drawing said stream of air-entrained particulate powder material from said internal cavity of said manifold through said outlet passageway and into said spray gun, said air amplifier means impacting said stream of air-entrained particulate powder material with a high velocity air stream in the course of passage therethrough to accelerate said stream of air-entrained particulate powder material through said spray gun for discharge onto the substrate.

2. The powder spray system of claim 1 in which said outlet passageway is formed in said manifold at an angle of about 90° relative to the longitudinal axis of said inlet passageway.

3. The powder spray system of claim 1 in which said outlet passageway is connected to said internal cavity of said manifold at a location vertically below said vent passageway, and at a location between said vent passageway and said inlet passageway.

4. A powder spray system for applying particulate powder material onto a substrate, comprising:

a source of particulate powder material having an outlet line and feeder means for transmitting a metered quantity of the particulate powder material into said outlet line;

a manifold having an internal cavity, said manifold being formed with a vent passageway open to atmosphere and connected to said internal cavity, said manifold being formed with an inlet passageway, an outlet passageway and a return passageway each connected to said internal cavity, said inlet passageway being connected to said outlet line of said particulate powder material source for transmitting particulate powder material from said source into said internal cavity of said manifold;

first air amplifier connected to said outlet passageway means for drawing ambient air through said vent passageway of said manifold into said internal cavity for combination with particulate powder material transmitted therein to form a stream of air-entrained particulate powder material within said internal cavity;

a spray gun connected to said first air amplifier means, said first air amplifier means drawing said stream of air-entrained particulate powder material from said internal cavity through said outlet passageway and into said spray gun, said first air amplifier means impacting said stream of air-entrained particulate powder material with a high velocity air stream in the course of passage therethrough to accelerate said stream of air-entrained particulate powder material through said spray gun for discharge onto the substrate;

second air amplifier means connected to said return passageway of said manifold for drawing ambient air through said vent passageway into said internal cavity for combination with particulate powder material transmitted therein to form a stream of air-entrained particulate powder material within said internal cavity, said second air amplifier means drawing said stream of air-entrained particulate powder material from said internal cavity through said return passageway and into a return line communicating with said particulate powder material source;

control means communicating with each of said first and second air amplifiers for simltaneously operating one of said first and second air amplifiers and closing the other so that said stream of air-entrained particulate powder material flows from said internal cavity of said manifold into either said spray gun or said return line.

5. The powder spray system of claim 4 in which said outlet passageway and said return passageway are formed in said manifold below said inlet passageway, the particulate powder material entering said internal cavity through said inlet passageway being moved by gravity toward said outlet passageway and said return passageway.

6. The powder spray system of claim 4 in which said outlet passageway is formed in said manifold at an angle of about 90° relative to the longitudinal axis of said inlet passageway.

7. The powder spray system of claim 4 in which said return passageway is formed in said manifold at an angle of about 45° relative to the longitudinal axis of said inlet passageway.

8. The powder spray system of claim 4 in which said return passageway is formed in said manifold at an angle of about 45° relative to the longitudinal axis of said outlet passageway.

9. The powder spray system of claim 4 further including filter means in said return line for filtering the particulate powder material prior to its transmission back to said powder source.

10. The method of applying particulate powder material onto a substrate, comprising:

feeding particulate powder material through an inlet passageway into the internal cavity of a manifold, said manifold being formed with an outlet passageway located vertically below said inlet passageway forming a powder flow path therebetween along which particulate powder material entering said internal cavity can flow by gravity toward said outlet passageway drawing ambient air into said internal cavity of said manifold at a location other than along said powder flow path between said outlet passageway and said inlet passageway to form a stream of air-entrained particulate powder material within said internal cavity;

drawing said stream of air-entrained particulate powder material from said internal cavity of said manifold through said outlet passageway and into a spray gun connected to said outlet passageway for ejection upon the substrate.

11. The method of applying particulate powder material onto a substrate, comprising:

feeding a metered quantity of particulate powder material from a powder source into an internal cavity formed in a manifold, said manifold being formed with a vent passageway open to atmosphere and an outlet passageway each communicating with said internal cavity;

intermittently activating first air amplifier means connected to said outlet passageway of said manifold, said first air amplifier means drawing ambient air through said vent passageway into said internal cavity of said manifold for combination with said particulate powder material therein to form a stream of air-entrained particulate powder material within said internal cavity;

drawing said stream of air-entrained particulate powder material from said internal cavity of said manifold through said outlet passageway and into a spray gun connected to said first air amplifier means for ejection onto a substrate;

intermittently activating second air amplifier means connected to a return passageway formed in said manifold in communication with said internal cavity, said second air amplifier means drawing ambient air through said vent passageway into said internal cavity of said manifold to form a stream of air-entrained particulate powder material within said internal cavity;

drawing said stream of air-entrained particulate powder material formed by operation of said second air amplifier means from said internal cavity of said manifold through said return passageway and into a return line communicating with said powder source; and simultaneously activating one of said first and second air amplifier means and closing the other.

* * * * *